July 20, 1965
CHI-SHENG LIU
DEFLECTION CIRCUIT WITH BARKHOUSEN OSCILLATION PREVENTIVE MEANS
Filed Oct. 30, 1962
3,196,309
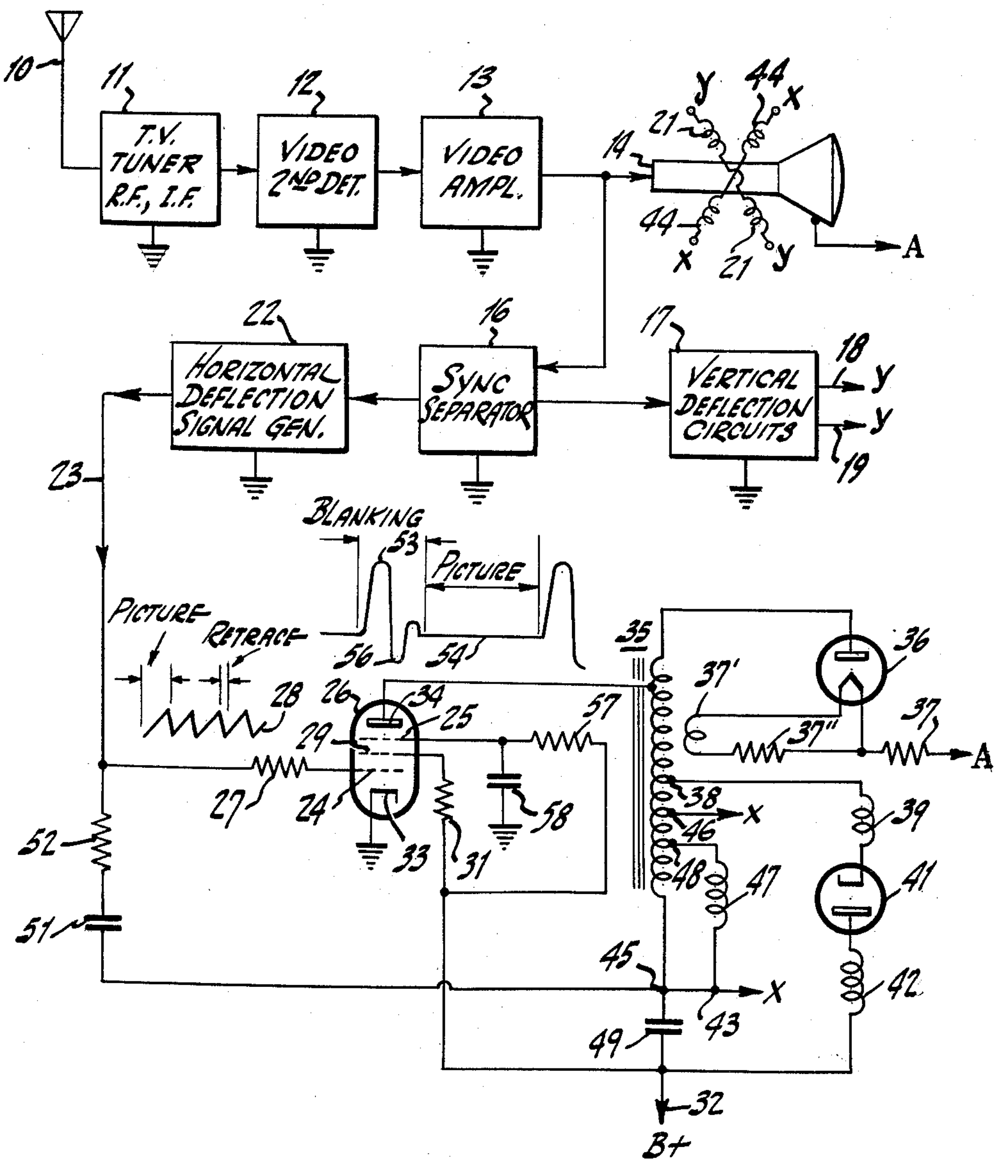
INVENTOR
CHI-SHENG LIU
BY
W. H. Spouagle
Attorney

United States Patent Office 3,196,309
Patented July 20, 1965

3,196,309

DEFLECTION CIRCUIT WITH BARKHAUSEN OSCILLATION PREVENTIVE MEANS

Chi-Sheng Liu, Indianapolis, Ind., assignor to Radio Corporation of America, a corporation of Delaware Filed Oct. 30, 1962, Ser. No. 234,163
5 Claims. (Cl. 315—27)

The present invention relates to new and improved television deflection apparatus and particularly to circuitry suitable for use in producing horizontal deflection of an electron beam.

In television receivers, the televised image is reproduced on the screen of a cathode ray tube by the horizontal and vertical deflection of an electron beam in response to deflection signals. When electromagnetic windings are used for such deflection purposes, a current wave of generally sawtooth shape is applied to the coils of the electromagnetic winding.

The sawtooth current wave is applied to the deflection coils by means of an output tube which supplies sufficient current to deflect the electron beam through the widest necessary deflection angle. In addition to conducting fairly heavy currents the horizontal output tube is also subjected to rapid fluctuations of applied voltage varying over a range of many thousands of volts.

One of the phenomena that has appeared in the image reproduced in the television receiver is known as the "snivet." Snivets are thin parallel vertical lines which may appear at one or more positions of the reproduced image. It has been suggested that the production of such thin vertical lines is due to Barkhausen oscillations developed in the horizontal output tube.

Barkhausen oscillations may be produced in a tube when a positive electrode is arranged between two more negative electrodes. The electrons present in the tube are repelled by the more negative electrodes back toward the positive electrode. The oscillations caused by the alternate attraction and repelling of electrons occurs in a frequency range determined by the dimensions and spacing of the electrodes and the potentials applied thereto. Such oscillations may produce radio frequency radiation in the video carrier frequency range of the television receiver. This radiation will then be detected and pass through such receiver in substantially the same manner as the video signal. The received radiation is then reproduced on the cathode ray screen in the form of the above-referred to thin vertical lines.

The Barkhausen oscillations may occur at different times during the operating cycle of the horizontal output tube. At one stage of such cycle when the tube is conducting it is operating substantially at a minimum anode operating voltage. Under these conditions the proper potential distribution for Barkhausen oscillations may be present. A discussion of the potential distribution leading to Barkhausen oscillations during the conduction cycle of the horizontal output tube may be found in U.S. Patent No. 2,834,913, issued to Leonard Dietch, on May 13, 1958.

At another stage of the operating cycle of the output tube, this tube is cut off. This cut-off occurs during the retrace interval of the deflection circuit. During this stage the anode voltage may actually go negative, again giving rise to the possibility of undesired Barkhausen oscillations.

Therefore, it is possible for the undesired snivets to appear at the left hand portion of the television screen if the Barkhausen oscillations occur during retrace and at the right hand portion of the screen if the Barkhausen oscillations occur during the trace interval when the output tube is conducting.

As mentioned above the snivets appear when the RF radiation falls within the video signal carrier frequency range of the television receiver.

Today most television receivers operate in the very high frequency (VHF) range. Thus the video carrier frequencies generally utilized are 54–88 megacycles for low frequency television channels and 174–216 megacycles for the high frequency television channels. Therefore, RF radiation occurring in these frequency ranges or harmonics thereof can produce the undesired snivets. However, more television broadcasting stations are being set up which broadcast in the ultra high frequency (UHF) range. Since this is substantially wider than the VHF range there is a much greater possibility that the RF circuits of the UHF television receiver will detect the undesired RF radiation and have them reproduced as snivets.

Accordingly, it is an object of the present invention substantially to eliminate the production of snivets during the reproduction of a televised image on the screen of a television receiver.

It is a second object of the present invention substantially to attenuate, or change the frequency of, Barkhausen oscillations, or both, in the horizontal deflection output tube of a television receiver.

Another object of the present invention is to provide a new and improved horizontal deflection output circuit for television receivers.

A further object of the present invention is to provide a new and improved operating potential arrangement for pentode electron discharge devices used in deflection output circuits of television receivers.

The apparatus incorporating the principles of the present invention includes an electrical circuit utilizing an electron discharge device having a cathode, an anode, and control, screen and suppressor electrodes. In such electrical circuit the magnitude of the current flowing through the discharge device rapidly changes tending to produce Barkhausen oscillations. Means are provided for substantially attenuating such oscillations by maintaining the potential of the suppressor electrode of the electron discharge device substantially higher than the potential of the cathode of such device.

In a preferred embodiment the electrical circuit is utilized in a television receiver and includes an electron discharge device having a cathode, an anode, and control, screen and suppressor electrodes. Means are provided for rendering the electron discharge device alternately conductive and non-conductive. Transformer means are connected to the anode which develops a voltage pulse when the electron discharge device is alternately rendered conductive and non-conductive. Finally, means are provided for maintaining the suppressor electrode at a potential substantially higher than the potential of the cathode electrode.

These and other objects and advantages of the present invention may best be understood by referring to the accompanying drawing which is a combination block and schematic diagram of a television receiving circuit embodying the novel features of the present invention.

Referring now to the drawing, there is indicated at 10 an antenna designed to intercept television broadcast signals and apply them to a television receiver. These signals are applied to the block designated 11 which includes the RF tuner and the video IF amplifiers. Since the advantages and operation of the present invention may be understood without referring to the audio portions of the television receiver, such portions are not illustrated in order to avoid unnecessarily complicating the drawing. However, it is to be understood that existing arrangements may be employed for the audio circuits as well as for any of the video circuits designated merely by blocks in this description.

The output signal from the IF amplifier of the block 11 is applied to the video second detector 12 whose output signal in turn is applied to the video amplifier 13. The amplified output of the video amplifier 13 is applied to the cathode ray tube 14. The composite television signal appearing at the ouput of amplifier 13 is also applied to the synchronizing signal separator circuit 16 commonly referred to as a "sync separator."

In further accordance with existing practice, the sync separator 16 supplies the vertical deflection circuits 17 with a vertical synchronizing signal. The vertical deflection circuits, which include, for example, the vertical deflection signal generator and amplifier, produce the vertical deflection signal at the output terminals 18 and 19 thereof which is applied to the terminals Y—Y of the vertical deflection yoke windings 21. Again in order to avoid unnecessarily complicating the drawing the vertical deflection circuits are combined in the single block 17.

The sync separator 16 also supplies a horizontal synchronizing signal to the horizontal deflection signal generator 22. The generator 22 produces on its output conductor 23 a signal having a sawtooth waveform which is applied to the control electrode 24 of a pentode 26 through a resistor 27. The sawtooth waveform so supplied is schematically represented by the waveform 28 adjacent the pentode 26.

The pentode 26 is the horizontal deflection output tube of the television receiver and has a screen electrode 29 connected by means of a resistor 31 to the B+ power supply terminal 32. The cathode 33 of the tube 26 is connected to a datum potential such as circuit ground. The anode 34 of the tube 26 is connected to an auto-transformer 35.

Connected to one end of the winding of the transformer 35 is the anode of a high voltage rectifier diode 36. The cathode of the diode 36 is connected to a resistor 37″ in series with a heater winding 37′ of the transformer 35. High voltage developed at the diode 36 is applied through a resistor 37 to the ultor or post-accelerating anode marked A, of the cathode ray tube 14.

Also connected to a point 38 along the auto-transformer is one end of an inductor 39 the other end of which is connected to the cathode of a damping diode 41. The anode of the diode 41 is connected by means of an inductor 42 to the B+ power supply terminal 32.

The lower terminal of the auto-transformer 35 is designated by the numeral 45 and is connected by means of a conductor 43 to one terminal X of the horizontal deflection coils 44. The other terminal X is connected to a point 46 along the auto-transformer.

Also connected to the terminal 45 is a width coil 47 the other end of which is connected to a point 48 along the auto-transformer. The terminal 45 is further connected to one side of a capacitor 49 the other side of which is connected to the B+ power supply terminal 32. Arranged between terminal 45 and grid resistor 27 is the series combination of a capacitor 51 and a resistor 52.

In operation, the horizontal sawtooth waveform 28 applied to the control electrode 24 of the tube 26 causes conduction in the tube 26 during the latter portion of the trace interval of the cathode ray tube deflection cycle in accordance with the well known reaction scanning principles. Conduction through the tube 26 in response to the positive-going portion of the sawtooth waveform produces a deflection current flow through the horizontal deflection coils 44, resulting ultimately in the deflection of the electron beam to the extreme right hand portion of the televison screen when viewed from the front.

As is well known, the beam must be returned to the left hand side of the television screen for the next horizontal scan. This is accomplished during the negative-going or retrace portion of the sawtooth waveform which abruptly cuts off the tube 26.

The sudden collapse of the magnetic field about the winding of the auto-transformer 35 produces, at the anode 34 of output tube 26, the high voltage pulse 53 of the waveform 54 shown in the drawing above the transformer 35. This high voltage pulse 53 occurs during the retrace interval of the deflection cycle. A transformed version of the pulse 53 at greater magnitude is rectified by the diode 36 for application to the ultor or post-accelerating anode A of the cathode ray tube 14.

The positive pulse 53 is followed by a negative pulse 56 representing the oscillation of the tuned circuit associated with the auto-transformer windings and the horizontal deflection coils. At this instant (of the negative pulse) the anode of the damping diode 41 becomes positive with respect to its cathode to damp out further oscillation. The waveform 54 represents generally the voltage appearing at the anode 34 of the output tube 26. It should be noted that the voltage swings abruptly from a very high positive value to a negative value which is less than the potential of the cathode 33.

At this time the potential of the screen electrode 29 is substantially higher than the potentials of the anode 34 or the control electrode 24 and cathode 33. Thus the potential distribution for Barkhausen oscillations exists, namely, an electrode at a positive potential arranged between electrodes at more negative potentials. As indicated above it is believed that this arrangement of potentials produces Barkhausen oscillations caused by the oscillation movement of the electrons about the screen grid 29.

If these Barkhausen oscillations occur at a frequency close to the frequency of the video signal carrier wave they may be picked up by the antenna or other portions of the television receiver and converted to spurious video signals which are displayed as snivets on the television screen. Under the conditions above-mentioned the Barkhausen oscillations occur when the output tube 26 is rendered non-conductive and accordingly video information representing such oscillations appear as vertical black lines or snivets at the left hand portion of the television screen when viewed from the front. As is well known with reaction scanning technique the horizontal deflection of the electron beam is controlled at this time by the energy stored in the horizontal deflection system including the scanning coils 44. The present invention substantially eliminates these Barkhausen oscillations in a manner to be explained subsequently.

As has been pointed out in the above-mentioned U.S. Patent No. 2,834,913 other theories concerning the production of Barkhausen oscillations in the horizontal output tube have also been presented. These oscillations may occur while the output tube is conducting. The horizontal output tube of the television receiver passes through an operating cycle wherein the tube has maximum and minimum anode current conditions, maximum and minimum screen current conditions and maximum and minimum anode voltage conditions. It has been suggested that Barkhausen oscillations may occur in the horizontal deflection output tube when the tube is operating at its minimum anode voltage condition (knee of the pentode operating characteristic), maximum screen current condition and maximum cathode electron emission.

This theory indicates that the electrons striking the anode give rise to secondary emission electrons from the anode. Normally, these secondary electrons are attracted back to the anode by the high positive potential thereon. However, at the condition of minimum anode potential during its conductive cycle the potential at the screen electrode may be so much higher than the anode potential that the secondary emission electrons is attracted towards the screen away from the anode. Again the condition for Barkhausen oscillations would exist. The screen electrode 29 at a high positive potential is surrounded by electrodes at much lower potentials. Accordingly the secondary emission electrons may oscillate about the screen electrode 29 to produce the Barkhausen oscillations and RF radiation as indicated hereinabove.

Since the horizontal deflection output tube 26 is conducting during the last mentioned oscillations the snivets due to the produced RF radiation occur in the right hand portion of the television screen. That is, with deflection circuits utilizing reaction scanning principles the horizontal output tube 26 conducts during the latter portion of the scanning interval.

In discussing the production of Barkhausen oscillations during conduction of the horizontal output tube the expression "minimum anode potential" is utilized. This refers to the anode potential at the "knee" of the operating characteristic of the tube 26. Such curve is the normal pentode operating characteristic and is illustrated in the above-referred to patent. Therefore, the term "minimum anode potential" as above refers to minimum anode potential while the output tube is operating with high anode currents.

The Barkhausen oscillations which produce the snivets in the television image are substantially reduced or attenuated by connecting the suppressor electrode 25 of the pentode 26 to a potential substantially higher than that of the cathode 33. In the illustrated embodiment the B+ power supply of the circuit supplies such higher potential. Accordingly the suppressor electrode 25 is connected to the B+ power supply terminal 32 by means of a resistor 57 by-passed by a capacitor 58.

With the connections so illustrated any electrons which are repelled or emitted by the anode 34 are attracted to the suppressor electrode 25 and very few, if any, return past the screen grid 29. Thus substantially no electrons will oscillate about the screen electrode 29. If any electrons do continue to so oscillate they will be very small in number and the frequency of their oscillations will be substantially changed. Thus any radiation which might occur will be at such a low level that little, if any, will be picked up and converted to snivet forming video signals.

Accordingly, the utilization of this arrangement substantially reduces the production of the undesired snivets regardless of whether the tube is conducting or non-conducting. Because Barkhausen oscillations and their harmonics usually are of relatively high frequency and are of considerable magnitude, this problem has been encountered to only a limited extent in television receivers operating in the relatively limited very high frequency (VHF) range, generally only in weak signal areas. With the present television receivers operating in the ultra high frequency (UHF) range, the probability that any Barkhausen oscillations produced in the horizontal output tube will occur in the video signal carrier frequency range is increased.

However, the illustrated potential arrangement for the electrodes of the pentode 26 substantially eliminates this problem by suppressing Barkhausen oscillations or shifting the oscillation frequency in the manner set forth above.

While the present invention has been described with respect to a preferred embodiment it should be appreciated that various modifications may be made in the circuitry without departing from the spirit or scope of this invention. It should further be noted that, while the illustrated circuit refers specifically to television receivers, it need not necessarily be limited thereto since it will operate properly substantially to reduce or eliminate Barkhausen oscillations which may occur in any electrical circuit utilizing a pentode or an electron discharge device having five or more electrodes.

For example, Barkhausen oscillations may occur in the audio output tube and the resulting radiation may be picked up by the RF detecting circuits for the audio signal carrier. The term "snivet" was actually coined because the noise reproduced in a speaker as a result of the Barkhausen oscillations sounder like the word "snivet." The above described potential arrangement when applied to the pentode output tube in the audio circuit of a radio receiver or the like substantially limits the undesired Barkhausen oscillations in this audio output circuit much the same manner as that described hereinabove in connection with the video circuit.

What is claimed is:

1. In an electromagnetic reaction scanning system for deflecting an electron beam during alternate relatively slow trace and relatively fast retrace periods the combination comprising:
   - an electron discharge device having a cathode, an anode and at least control and suppressor electrodes;
   - an inductive device;
   - an electromagnetic beam deflection yoke connected to said inductive device;
   - means connecting said anode to said inductive device;
   - means for rendering said electron discharge device conducting during the latter portion of each electron beam trace period and non-conducting during each electron beam retrace period;
   - a damper circuit connected to said inductive device and adapted to receive and store energy derived from said yoke and said inductive device during each electron beam retrace period and to return said stored energy to said yoke during the initial portion of each electron beam trace period;
   - and means for maintaining said suppressor electrode at a potential higher than the potential of said cathode.

2. In an electromagnetic reaction scanning system for deflecting an electron beam during alternate relatively slow trace and relatively fast retrace periods, the combination comprising:
   - an electron discharge device having a cathode, an anode and at least control and suppressor electrodes;
   - an inductive device;
   - an electromagnetic beam deflection yoke connected to first and second points of said inductive device;
   - means connecting said anode to a third point of said inductive device;
   - means for rendering said electron discharge device conducting during the latter portion of each electron beam trace period and non-conducting during each electron beam retrace period;
   - a damper circuit including a diode connected to a fourth point of said inductive device and adapted to receive and store energy derived from said yoke and said inductive device during each electron beam retrace period and to return said stored energy to said yoke during the initial portion of each electron beam trace period;
   - and means for maintaining said suppressor electrode at a potential higher than the potential of the cathode of said electron discharge device.

3. In an electromagnetic system for deflecting an electron beam during alternate relatively slow trace and relatively fast retrace periods to scan successive lines of a raster, the combination comprising:
   - an electron discharge device having a cathode, an anode and control, screen and suppressor electrodes;
   - an inductive device having a plurality of taps intermediate its terminals;
   - an electromagnetic beam deflection yoke connected to at least a first intermediate tap of said inductive device;
   - means connecting said anode to said inductive device;
   - means for rendering said electron discharge device conducting during the latter portion of each electron beam trace period and non-conducting during each electron beam retrace period;
   - a circuit including a diode having its cathode connected to a second intermediate tap of said inductive device and its anode to a point of such potential as to render said diode alternately conductive and non-conductive so that said circuit receives and stores energy derived from said yoke and said inductive device during each electron beam retrace period and return said stored energy to said yoke during the initial portion of each electron beam trace period;

and means for maintaining at least said suppressor electrode at a potential higher than the potential of the cathode of said electron discharge device.

4. In an electromagnetic system for deflecting an electron beam during alternate relatively slow trace and relatively fast retrace periods to scan successive lines of a raster, the combination comprising:

an electron discharge device having a cathode, an anode and control screen and suppressor electrodes;

a transformer winding having a plurality of taps intermediate its terminals;

an electromagnetic beam deflection yoke connected to at least a first intermediate tap of said winding;

means connecting said anode to a second intermediate tap of said winding;

means for rendering said electron discharge device conducting during the latter portion of each electron beam trace period and non-conducting during each electron beam retrace period;

a circuit including a diode having its cathode connected to a third intermediate tap of said winding and its anode connected to a point of reference potential, said circuit being adapted to receive and store energy derived from said yoke and said transformer winding during each electron beam retrace period and to return said stored energy to said yoke during the initial portion of each electron beam trace period;

and means for maintaining said screen and suppressor electrodes at potentials higher than the potential of the cathode of said electron discharge device.

5. In an electromagnetic system for deflecting an electron beam during alternate relatively slow trace and relatively fast retrace periods to scan successive lines of a raster, the combination comprising:

an electron discharge device having a cathode, an anode and control, screen and suppressor electrodes;

an auto-transformer having two terminals and a plurality of intermediate taps;

an electromagnetic beam deflection yoke connected between one terminal and a first intermediate tap of said transformer;

means connecting said anode to a second intermediate tap of said transformer;

means for rendering said electron discharge device conducting only during the latter portion of each electron beam trace period and non-conducting during each electron beam retrace period;

a circuit including a diode having its cathode connected to a third intermediate tap of said transformer and its anode connected to a point of positive potential to receive and store energy derived from said yoke and said transformer during each electron beam retrace period and to retrace said stored energy to said yoke during the initial portion of each electron beam trace period;

and means for maintaining said screen and suppressor electrodes at potentials substantially higher than the potential of the cathode of said electron discharge device.

References Cited by the Examiner

UNITED STATES PATENTS 2,459,187 1/49 Schlesinger ------------ 315—27

DAVID G. REDINBAUGH, *Primary Examiner.*

ARTHUR GAUSS, *Examiner.*